No. 748,238. PATENTED DEC. 29, 1903.
F. VERPLAST.
SCALE.
APPLICATION FILED AUG. 1, 1903.
NO MODEL.

Witnesses:
Nathan C. Lombard 2nd
Robert W. Howard

Inventor:
Frederick Verplast.
by Charles F. A. Smith
Atty.

No. 748,238. Patented December 29, 1903.

UNITED STATES PATENT OFFICE.

FREDERICK VERPLAST, OF BOSTON, MASSACHUSETTS, ASSIGNOR TO THE NORTH AMERICAN SCALE COMPANY, OF BOSTON, MASSACHUSETTS, A CORPORATION OF MAINE.

SCALE.

SPECIFICATION forming part of Letters Patent No. 748,238, dated December 29, 1903.

Application filed August 1, 1903. Serial No. 167,836. (No model.)

*To all whom it may concern:*

Be it known that I, FREDERICK VERPLAST, a citizen of the United States, residing at Boston, in the county of Suffolk and State of Massachusetts, have invented certain new and useful Improvements in Scales, of which the following is a specification, reference being had therein to the accompanying drawings.

My invention relates to improvements in scales whereby the weighing-springs or weighing mechanism is adjusted.

The invention consists in the combination of elements and in certain parts of construction entailed in the combination of said elements to obtain the desired result.

A full understanding of the invention can best be given by a detailed description of a preferred construction embodying the various features of the invention, and such a description will now be given in connection with the accompanying drawings, and I attain my object by the mechanism there illustrated, showing such preferred construction, and the features forming the invention will then be specifically pointed out in the claims.

Figure 1:
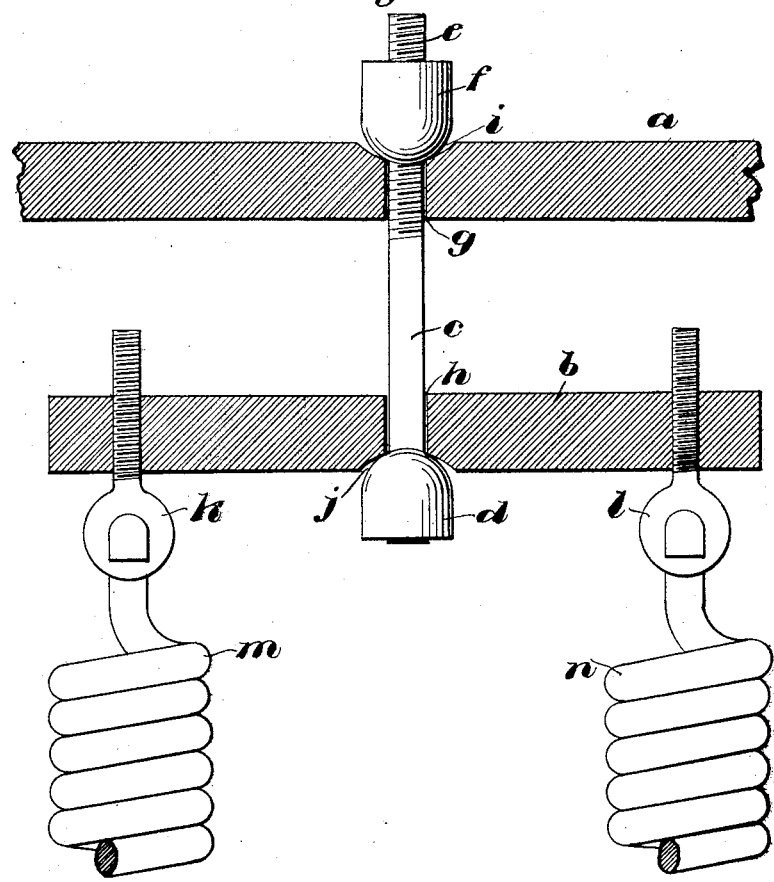
Figure 2:
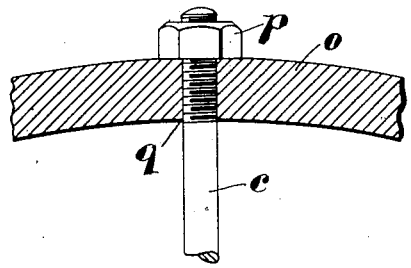

In said drawings, Figure 1 represents a front elevation of my device, showing part of the framework of a scale in section. Fig. 2 is a front elevation of a modified form of part of my device.

Similar letters refer to similar parts throughout the views.

In the drawings, $a$ represents a bar or board fastened to the upper part of the head-casing (not shown) of the scale. The cross-head $b$ is mounted to oscillate on a spherical bearing or enlargement $d$, which is preferably a ball or nut, and is on a stud or bolt $c$, which extends through aperture $h$ in the cross-head $b$, and the stud or bolt $c$ may be threaded at its lower part to receive said spherical bearing. The cross-head $b$ has the socket-bearing $j$, so that the cross-head $b$ will freely rest upon the upper rounded end of the spherical bearing $d$ and can slide unhindered upward on the bolt or stud $c$ or to right or left upon the bearing $d$, thus allowing free oscillation of the same.

The stud or bolt $c$ is threaded at its upper part $e$ and extends through the aperture $g$ of the bar $a$, which aperture may be sufficiently large to allow of an oscillation of the stud or bolt $c$, as will be hereinafter explained, and it may have another spherical bearing, bolt, or nut $f$, which turns upon the threaded end $e$ of the stud $c$ and may be fitted to turn or oscillate in the fixed socket-bearing or cut-away portion $i$ of the bar $a$. Engaged with or screwed into the oscillatory cross-head $b$ are screws $k$ and $l$, having eyes formed in their heads and in which are engaged the upper ends of the weighing-springs $m$ and $n$. These weighing-springs $m$ and $n$ usually have their lower portions suitably engaged with another cross-head or T-shaped frame. (Not shown.)

If desired, the bar or board $a$ may be dispensed with, and the bolt or stud $c$ may extend through an opening $q$ in the upper part of the weighing-scale casing $o$ or may be screwed into said casing, as shown in Fig. 2, in which case the weighing mechanism would be adjusted by the screwing or adjusting of this bolt or stud $c$ into the casing $o$, and after the weighing mechanism is adjusted a nut $p$ can be tightened down upon said bolt or stud $c$ and casing $o$ to hold said stud rigidly. Upon the lower end of said bolt or stud would be the spherical bearing $d$, upon which would rest the cross-head $b$, as shown in Fig. 1.

Having described my invention, what I claim as new, and desire to secure by Letters Patent, is—

1. In a weighing-machine having a frame in combination with weighing mechanism, a cross-head provided with a socket bearing on its under side weighing-springs supported by the cross-head, a stem attached to the frame of the machine extending downward through the cross-head into the socket-bearing, and a hemispherical nut attached to the lower end of the stem resting within the socket-bearing, substantially as shown and described.

2. In a weighing-machine provided with a casing in combination with weighing mechanism, a bar attached to and extending across the inner side of the casing, a rod having its upper end threaded and extending through the bar, a nut for adjusting the rod vertically on the bar, weighing-springs, a cross-head supporting the weighing-springs having a socket-bearing on its under side, and the rod provided with a hemispherical nut resting within the socket-bearing, substantially as shown and described.

3. In a weighing-machine having a frame provided with a socket-bearing in combination with the weighing mechanism, a rod threaded at its upper part, an upper hemispherical nut resting within the socket-bearing for adjusting said rod vertically, and allowing free oscillation of the rod, and the rod having at its lower end a hemispherical nut, a cross-head oscillatory upon said lower hemispherical nut and weighing-springs connecting the oscillatory cross-head with the weighing mechanism and adjustable by the turning of the upper hemspherical nut upon the rod, substantially as shown and described.

4. In a weighing-machine provided with a casing in combination with the weighing mechanism, a hanging bolt, hemispherical adjustable nuts, the casing having a bearing receiving the upper nut, a cross-head having a bearing for receiving the lower nut and having a free vertical movement upon the bolt, supporting weighing-springs attached to the cross-head and adjustable by the turning of the hemispherical nuts upon the bolt, substantially as shown and described.

In testimony whereof I affix my signature in presence of two witnesses.

FREDERICK VERPLAST.

Witnesses:
CHARLES F. A. SMITH,
ROSE E. DOHERTY.